3,413,266
METHOD OF IMPROVING SOLVENT RESISTANCE OF POLYCARBONATES BY TREATMENT WITH F₂ GAS
George S. Saines, Fishkill, and Ronald E. Jones, Glenham, N.Y., assignors to Texaco Inc., New York, N.Y., a corporation of Delaware
No Drawing. Filed Mar. 22, 1966, Ser. No. 536,298
3 Claims. (Cl. 260—47)

ABSTRACT OF THE DISCLOSURE

The solvent resistance of polycarbonates may be improved by contacting the surface of the polycarbonate with fluorine gas at a temperature of 20 to 65° C. between 0.1 and 5 hours, and a pressure of 100 to 300 mm.

---

This invention relates to a method of surface treating polycarbonate polymer structures such as polycarbonate sheeting, containers, films, coatings and the like. More particularly, it is directed to the process of improving the solvent resistance of a polycarbonate polymeric structure via fluorination of the structure's surface followed by a heat treatment of the structure.

In the past polycarbonate polymers of the general formula:

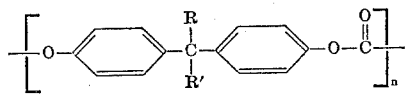

where R and R' are the same or different alkyl of from 1 to 4 carbons and where $n$ is an average integer between about 40 and 2000, have been utilized in the manufacture of plastic structures. The polymers and resulting structures are further described in the textbook "Polycarbonates" by William F. Christopher and Daniel W. Fox published by Reinhold Publishing Corp., New York (1962). Although the polycarbonate polymers have many useful properties such as good dimensional stability, creep resistance, electrical resistance, ductility under high impact, they have the severe limitation of poor resistance to the dissolving action of many of the standard organic solvents. For example, polycarbonate polymer structures have practically instant solubility in chloroform, tetrachloroethane and benzene. Further, contact with these solvents even in very dilute form cause sever deterioration of the structure.

We have discovered, and this constitutes our invention, a method of improving the organic solvent resistance of structures manufactured from polycarbonate polymer of the formula:

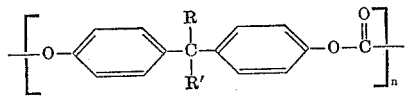

where R, R' and $n$ are as heretofore defined. More particularly, the method of our invention comprises a two step process of contacting the polycarbonate polymer structure's surface with fluorine followed by an annealing (heat) treatment of the surface fluorinated polycarbonate structure. Specific examples of R and R' are methyl, ethyl and butyl.

Specifically, in the first step fluorination phase of the method the polycarbonate surface to be treated whether it be a container type, coating type, a sheeting type or etc. type surface is contacted with fluorine gas at a temperature between 20 and 65° C. advantageously for a period between about 0.1 and 5 hours. This contact can be accomplished by standard means such as placing the polycarbonate structure to be treated in a glass lined reactor, evacuating the reactor, introducing the fluorine gas therein. Under advantageous conditions, the fluorine gas pressure in said reactor is maintained in the range between about 20 and 300 mm. Hg, preferably between about 100 and 300 mm. Hg, although higher and lower pressures may be employed.

As the next step, the fluorine contact is terminated and the surface fluorinated polycarbonate structure is then subjected to a heating step at a temperature between about 140 and 200° C., preferably between about 160 and 180° C., advantageously for a period of time between about 1 and 4 hours, and preferably between about 3 and 4 hours. Under preferred conditions, the heating is conducted in an inert gas atmosphere (e.g., nitrogen) or under vacuum (e.g., less than 50 mm. Hg).

In the heat treatment phase of the method the polycarbonate polymer structure can be treated in the same reactor as the fluorine gas contact, e.g., by first removing the fluorine gas from the reactor, flushing out of the reactor with inert gas or air and then subsequently heating the reactor containing said structure to be desired temperature in a vacuum or in an inert gas or air atmosphere at atmospheric or subatmospheric pressures. Alternatively, the fluorinated polycarbonate structure may be removed from the fluorination reactor with the heating taking place in a separate oven type of apparatus under the aforedescribed atmospheric conditions.

In the foregoing method, the fluorinating followed by heating (annealing) is an essential combination of the steps for the rendering of the polycarbonate structure substantially more organic solvent resistant. Heat treatment alone has no effect on the polycarbonate. Further, if the polycarbonate surface is merely fluorinated without the subsequent heat treatment, the fluorinated surface layer although temporarily resisting the action of organic solvents, eventually undesirably peels and breaks away from the unfluorinated polycarbonate underlayer leaving said underlayer exposed to the full ravages of solvent action. Further, fluorination of the polycarbonate surface undesirably enhances the water wettability thereof and also renders the fluorinated surface prone to disintegration when in contact with water. In contrast, the second step heat treatment renders the fluorinated polycarbonate surface substantially less water wettable and substantially more resistant to peeling and removal from the unfluorinated undersurface.

It is theorized that the reason that the fluorination promotes the ready peeling of the fluorinated layer from the unfluorinated underlayer is that fluorination apparently disrupts the molecular packing of the polycarbonates due to a change in the spatial relationship of the carbonate atoms which make up the polymer backbone. The heat treatment appears to improve the adhesion between fluorinated top layer and the immediate adjacent unfluorinated underlayer by maximizing the inter-molecular attractive forces.

In regard to the first stage fluorination reaction, it is believed that an addition reaction on the aromatic component of the polycarbonate takes place and that this proceeds at a faster rate than the subdivision of hydrogen thereon thereby converting the polycarbonate into a relatively solvent insoluble fluorinated cyclohexyl system. The addition of fluorine to aromatic rings alters the bond angles of the carbon atoms changing them from a planar to tetrahedral spatial arrangement. This transformation affects the packing of the molecules since the phenylene rings in the unfluorinated polycarbonate undersurface are essentially planar while the cyclohexyl rings in the fluorinated surface are puckered and in addition contain more substituents in the added fluorine atoms. The theorized fluorination reaction is further described by the following chemical equations in which R and R' are methyl:

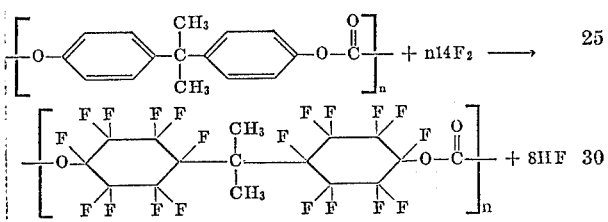

where $n$ is an average integer between about 40 and 2000.

It is to be noted that the problem of peeling is not experienced in surface fluorinated aliphatic polymers such as polyethylene since there appears to be no change in structural relationship between the fluorinated and unfluorinated polyethylene. Further, it is to be noted that of the subject fluorination and heat treatment process is applied to polystyrene, the heat treatment does not correct the breaking and peeling tendency of the fluorinated polystyrene surface.

The following examples further illustrate the method of the invention but are not to be construed as limitations thereof.

EXAMPLE I

The polycarbonate structures employed in the following described runs were 3″ x 5″ x 0.005″ and ½″ x 4″ x 0.005″ strips of aforedescribed polycarbonate polymer where $n$ is about 100. The strips are further characterized by an ultimate tensile strength of 11,300 p.s.i., an elongation of 150% and an intrinsic viscosity in tetrahydrofuran at 25° C. of 0.48 deciliter/gram.

The polycarbonate strips were washed in demineralized water to remove dust followed by a pentane wash to remove grease. The washed strips were dried in a vacuum oven at 50–60° C. for 0.5 hours at 3–5 mm. Hg. The strips were weighed, hung in a vertical position on copper racks and placed in a glass flask fitted with a fluorine gas inlet tube, a gas evacuation tube and a thermometer. The flask was evacuated to a pressure below 1 mm. Hg, heated to the desired temperature using a heating mantle, and then fluorine gas was bled into the flask over a period of several minutes. The fluorine was allowed to remain in contact with the strips for the desired period of time whereupon the fluorine was evacuated from the flask. The fluorinated strips were washed in distilled water and placed in an oven on metal trays. The oven was evacuated and nitrogen was introduced therein until the desired nitrogen pressure was reached and the oven heated to the desired temperature for the desired period of time.

The thus treated polycarbonate strips were then tested in respect to their water and organic solvent resistance by soaking them in a vertical position in glass cylinders filled with the testing liquid for the desired period of time.

The test data and results are reported below in the subsequent sub-examples.

EXAMPLE Ia

Table Ia immediately below sets forth the weight gain of the polymer in strips, subject to the method of the invention. The dimensions of the strips were 3″ x 5″ x 0.005″ for Runs A, C and D and ½″ x 4″ x 0.005″ for Run B. In Runs A and B the fluorination time was two hours and in Runs C and D one hour. The fluorination temperature was 25° C. The annealing of the fluorinated strips was conducted for 4 hours at 160° C. at 50 mm. Hg pressure of prepurified nitrogen.

TABLE Ia

| $F_2$ Run | Pressure, mm. Hg | Wt. Gain Aver./ Sq. In., g. | No. of Strips |
|---|---|---|---|
| A | 300 | 0.00202 | 10 |
| B | 300 | 0.00227 | 10 |
| C | 100 | 0.00077 | 5 |
| D | 20 | 0.00015 | 5 |

EXAMPLE Ib

The following table illustrates the importance of the annealing step in reenforcing the adhesion between the surface fluorinated layer and unfluorinated underlayer of the polycarbonate strip as well as improving the hydrophobic properties of the fluorinated surface. The polycarbonate strips employed were of ½″ x 4″ x 0.005″ dimensions. The fluorination temperature was 25° C. and the fluorine gas pressure was 100 mm. Hg, the fluorination time was 1 hour, and the atmosphere in the annealing step was 50 mm. Hg of prepurified nitrogen. The "observation" column below recites the effect of soaking the heat treated fluorinated strips in about 50 mls. of water at room temperature and the time required to accomplish said effect.

TABLE Ib

| Run | Annealing Step, ° C./Hrs. | Observation |
|---|---|---|
| E | 140/1 | 45 hrs.—Moderately wetted. |
| F | 140/4 | 42 hrs.—Slightly wetted. |
| G | 150/0.1 | 3 min.—Peeled. |
| H | 150/0.5 | 11 min.—Peeled. |
| I | 170/0.1 | 22 min.—Peeled. |
| J | 170/0.5 | 97 min.—Peeled. |
| K | 170/1 | 74 hrs.—Slightly wetted. |
| L | 170/4 | 76 hrs.—Slightly wetted. |

EXAMPLE Ic

The following table demonstrates the effect of the fluorination and annealing treatment on the resistance of the resultant heat treated fluorination polycarbonate strips to the solvent action of chloroform, tetrachloroethane and benzene. The strips were of ½″ x 4″ x 0.005″ dimensions. The fluorination was conducted at 25° C. for 1 hour. The atmosphere in the annealing step was 50 mm. Hg of prepurified nitrogen. The "Observation" column below recites the effect of immersing the fluorinated, heat treated polycarbonate strip in about 50 mls. of organic solvent at room temperature and the time required to accomplish said effect.

TABLE Ic

| Run | Fluorination, mm. Hg F₂ | Heating, °C./Hrs. | Observation |
|---|---|---|---|
| Solvent; chloroform: | | | |
| AA | 20 | 140/1 | ½ min.—Surface pitted; 1 min.—fluorinated surface broke away. |
| BB | 50 | 140/1 | 1 min.—Pitted; 10 min.—Broke. |
| CC | 50 | 140/4 | 1 min.—Pitted; 10 min.—Broke. |
| DD | 100 | 140/1 | 2 min.—Pitted; 18 min.—Broke. |
| EE | (¹) | 150/1 | } Strip dissolved in 45 seconds. |
| FF | (¹) | (¹) | |
| Solvent; symmetrical tetrachloroethane: | | | |
| GG | 300 | 170/1 | } Softening of strip surface after 3 hrs. and surface broke in order of GG, HH. |
| HH | 300 | 170/4 | |
| II | ²300 | (¹) | 27 min.—Pitting; 16 hrs.—Broke. |
| JJ | ²300 | 170/1 | } 45 min.—Pitting; 21 hrs.—Not broken. |
| KK | ²300 | 170/4 | |
| LL | (¹) | (¹) | Strip dissolved immediately. |
| Solvent; benzene: | | | |
| MM | 20 | 140/1 | 1 min.—Pitted; 9 min.—Broke. |
| NN | 50 | 140/1 | 3 min.—Pitted; 20 min.—Broke. |
| OO | 50 | 140/4 | 7 min.—Pitted; 25 min.—Broke. |
| PP | 100 | 140/1 | 10 min.—Pitted; 49 min.—Broke. |
| QQ | 100 | 140/4 | 10 min.—Pitted; 60 min.—Broke. |
| RR | 300 | (¹) | } Pitting began in 10 min. broke in 4 hrs. in order of RR, SS, TT. |
| SS | 300 | 170/1 | |
| TT | 300 | 170/4 | |
| UU | ²300 | (¹) | 14 min.—Pitted; 18 hrs.—Not broken. |
| VV | ²300 | 170/1 | 18 min.—Pitted; 18 hrs.—Not broken. |
| WW | ²300 | 170/4 | 45 min.—Pitted; 18 hrs.—Not broken. |
| XX | (¹) | 175/1 | } Dissolved in 5 minutes. |
| YY | (¹) | (¹) | |

¹ None.
² Fluorination for two hours.

As can be seen from the foregoing, the combination of fluorination and annealing renders polycarbonate polymer structures more resistant to standard organic solvents such as chloroform, tetrachloroethane and benzene.

EXAMPLE II

This example demonstrates the selectivity of the method of invention in respect to the polymer utilized.

The method of the invention was employed as described in Example I except strips of polystyrene polymer strips of ½" x 4" x 0.005" dimensions and of an ultimate tensile strength of 9,100 p.s.i. were substituted for the polycarbonate strips. Further exceptions were the strips were fluorinated at 25° C. for 1 hour in a gaseous fluorine atmosphere under 500 mm. Hg pressure. The fluorination treatment was followed by heating the polystyrene at 90° C. for 4 hours. Comparative strips were employed which were merely fluorinated. The "Observation" column below recites the effect of immersing the test strips in about 50 mls. of solvent at room temperature. The test data and results are reported below in Table II:

TABLE II

| Film | Solvent | Observation |
|---|---|---|
| Fluorinated | Chloroform | } Surface wet on contact peeling in 15 min., unfluorinated interior dissolved in 2 hours, outer shell remains. |
| Fl. plus heated | do | |
| Fluorinated | Benzene | } Surface wet on contact, pitting in about 1 hour. |
| Fl. plus heated | do | |

As can be seen the solvent resistance of the fluorinated polystyrene is not improved by heat treatment.

We claim:

1. A method of improving the solvent resistance of a solid structure composed of a polycarbonate polymer having the formula:

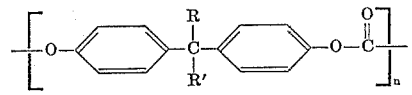

where R and R' are alkyl of from 1 to 4 carbons and n is an average integer of between about 40 to 2000, comprising contacting said structure with fluorine gas at a temperature between about 20 and 65° C. and subsequently heating said structure in the absence of fluorine gas at a temperature between about 140 and 200° C.

2. A method in accordance with claim 1 wherein said R and R' are methyl, contacting is conducted for a period of between about 0.1 and 5 hours utilizing a fluorine gas pressure between about 20 and 300 mm. Hg and said heating is conducted for a period between about 1 and 4 hours in an inert gas atmosphere.

3. A method in accordance with claim 2 wherein said inert gas is nitrogen.

References Cited

UNITED STATES PATENTS

| | | | |
|---|---|---|---|
| 2,145,639 | 1/1939 | Zander | 260—3.2 |
| 2,788,306 | 4/1957 | Cox | 260—92.1 |
| 3,354,135 | 11/1967 | Scarso | 260—92.1 |

MURRAY TILLMAN, Primary Examiner.

PAUL LIEBERMAN, Assistant Examiner.